United States Patent [19]
Yamamoto et al.

[11] Patent Number: 5,876,557
[45] Date of Patent: Mar. 2, 1999

[54] SAFETY DEVICE FOR FILM REMOVING APPARATUS

[75] Inventors: Hiroshi Yamamoto; Kazuo Katsuno; Toshikazu Watanabe, all of Oota, Japan

[73] Assignee: Fuji Jukogyo Kabushiki Kaisha, Tokyo, Japan

[21] Appl. No.: 790,534

[22] Filed: Jan. 30, 1997

[30] Foreign Application Priority Data

Mar. 8, 1996 [JP] Japan .................................... 8-051915

[51] Int. Cl.⁶ .................................................. B32B 35/00
[52] U.S. Cl. ......................... 156/584; 156/344; 156/352; 100/53
[58] Field of Search ..................................... 156/344, 584, 156/352; 264/37.3, 37.31, 37.32, 37.33; 29/426.3, 426.5; 100/53

[56] References Cited

U.S. PATENT DOCUMENTS

| | | | |
|---|---|---|---|
| 3,951,727 | 4/1976 | Greenberg | 156/584 |
| 4,007,677 | 2/1977 | Fox | 100/53 X |
| 4,599,131 | 7/1986 | Matuszak | 156/584 |
| 4,650,535 | 3/1987 | Bennett et al. | 156/332 |
| 5,304,276 | 4/1994 | MacLeod et al. | 156/344 |
| 5,320,035 | 6/1994 | Sanchez et al. | 100/53 X |
| 5,579,685 | 12/1996 | Raio | 100/53 |
| 5,579,884 | 12/1996 | Appleyard et al. | 100/53 X |
| 5,678,478 | 10/1997 | Goyal et al. | 100/53 X |
| 5,788,811 | 8/1998 | Yamamoto et al. | 156/584 |

*Primary Examiner*—Mark A. Osele
*Attorney, Agent, or Firm*—Beveridge, DeGrandi, Weilacher & Young, L.L.P.

[57] ABSTRACT

A safety device is provided for a film removing and peeling apparatus, which rolls a coated resin member between a pair of rolls facing each other and rotating at different peripheral rotating speeds and which applies a shearing stress between the resin material and a film to peel the film from the resin material. The safety device includes: a flat plate to which a resin material is fed, the flat plate being provided so as to extend in a substantially horizontal direction at a height substantially corresponding to a gap between the rolls, and the flat plate having a front edge located so as to be close to the rolls; a pushing plate for pushing material on the flat plate to squeeze the resin material into the gap between the rolls; and an air cylinder for moving the pushing plate in a forward direction to cause the pushing plate to push material on the flat plate.

8 Claims, 9 Drawing Sheets

SAFETY DEVICE FOR FILM REMOVING APPARATUS

BACKGROUND OF THE INVENTION

1. Field of the Invention

The present invention relates to a safety device for a film removing apparatus. More specifically, the invention relates to a safely device for a film removing apparatus for peeling a film from a coated resin product, e.g. a bumper or a side lacing, which is used as a functional part such as a decoration or a buffer for an automotive vehicle, or CD-ROM.

2. Description of the Prior Art

In recent years, a lot of people have taken a great interest in environmental problems and a reuse of natural resources, so that recycling resin products has been demanded. For example, in the field of automotive vehicle industry, recycling defective products occurred while manufacturing the resin products such as a bumper and a side lacing and the recycling of the resin products removed and recovered from scrapped cars have been widely noticed.

The resin products of this type, such as the bumper and the side lacing, are often coated in order to improve the appearance and quality thereof. For example, in the case of a typical bumper, a film is coated on a resin material of a thermoplastic resin such as a polypropylene resin, through a primer layer of a thermoplastic resin such as a chlorinated polyolefine resin. The film is a thermosetting resin such as an amino polyester resin, an amino acryl resin, a polyester urethane resin and an acryl urethane resin. Although these resins are liquid before curing operation, a bridging structure is formed therein by baking finish process. The structure is so firm and dense that the coated resin bumper has excellent chemical resistance, heat resistance, abrasion resistance, weather and surface glossiness.

However, when the coated bumper is directly crushed to pellets for reuse, the polypropylene resin material serving as the material of the resin product is contaminated with film pieces. When such a polypropylene resin material contaminated with the film pieces is molded, the fluidity of the molten resin is inhibited by the presence of the film pieces, so that molding defects such as "yellowing", "weld mark" and "bubble" may be caused in the resin product, and the film pieces emerged on the surface from the resin product may spoil the appearance of the resin product.

In addition, although the film piece is a thermosetting resin, the polypropylene resin serving as a base resin is the thermoplastic resin. Therefore, since there is no appreciable interaction between the film piece and the base resin, kneading in the recycled resin is inhibited by the film pieces which have not been minutely recycled, so as to notably deteriorate the mechanical property of the recycled resin product and to largely restrict the scope the recycled resin product according to the present invention.

Figure 10:
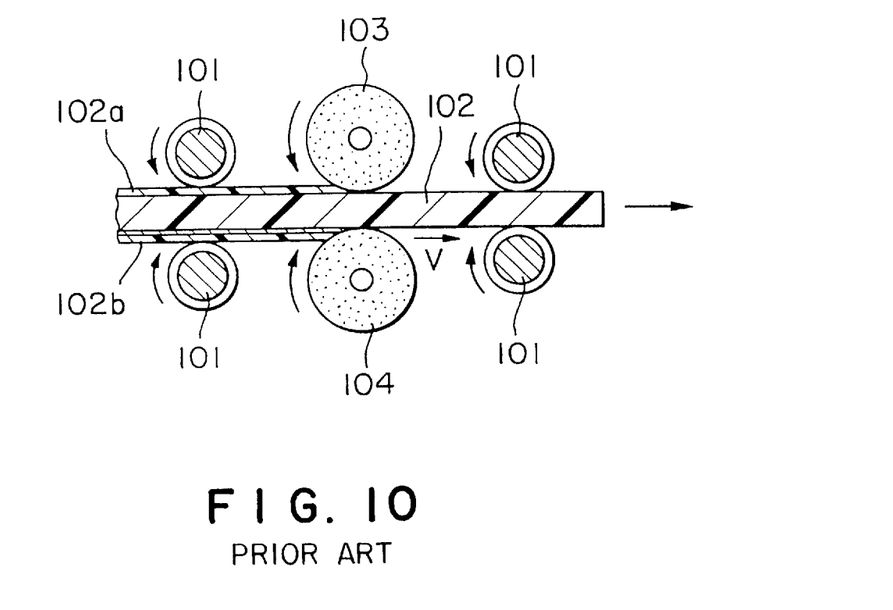
FIG. 10 is an explanatory drawing of a conventional film peeling apparatus.

Therefore, it is required to remove the film when the coated resin product is recycled. Such a system for removing the film from the resin product is disclosed in Japanese Patent Laid-Open No. 5-337941. This illustrates a peeling apparatus for the surface of a synthetic resin as shown in FIG. 10.

In this peeling apparatus, a resin product, e.g. a side lacing 102, is carried to the place between rotating bodies 103 and 104 of an expandable synthetic resin by means of a pair of carrier rollers 101. The carrier speed V of the side lacing 102 is set to be lower than the peripheral rotating speed of the rotating bodies 103 and 104, so as to cut and remove a film 102a and a double-faced tape 102b from the side lacing 102 by applying a high frictional force to the film 102a and the double-faced tape 102b on the side lacing 102. Then, the side lacing 102 is carried to the outside by a pair of carrier rollers 101.

However, in this apparatus, since the resin product is brought into contact with the rotating bodies 103 and 104 of an expandable synthetic resin, the brittle fracture of the rotating bodies 103 and 104 may occur to produce dusts so as to make the work environment worse. In addition, this apparatus is not suitable for bent or curved resin products. In order to eliminate these problems, for example, Japanese Patent Laid-Open No. 7-256640 discloses a method for rolling a coated resin member and for applying a shearing stress between the resin member and the film to peel the film from the resin material by a film peeling apparatus which has a pair of rollers facing each other and having different peripheral rotating speeds.

SUMMARY OF THE INVENTION

It is therefore an object of the present invention to eliminate the aforementioned problems and to provide a safety device for safely operating a film removing apparatus which rolls a coated resin member between a pair of rollers facing each other and rotating at different peripheral rotating speeds and which applies a shearing stress between the resin material and the film to remove or peel the film from the resin material. In order to accomplish the aforementioned and other objects, according to one aspect of the present invention, there is provided a safety device for a film peeling apparatus, which rolls a coated resin member between a pair of rolls facing each other and rotating at different peripheral rotating speeds and which applies a shearing stress between a resin material and a film to peel the film from the resin material, the safety device comprising: a flat plate portion to which a resin material is fed, the flat plate portion being provided so as to extend in a substantially horizontal direction at a height substantially corresponding to a gap between the rollers, and the flat plate portion having a front edge located so as to be close to the rollers; a pushing plate for pushing material on the flat plate portion to squeeze the resin material into the gap between the rollers; and a pushing-plate driving unit for moving the pushing plate in a forward direction to cause the pushing plate to push material on the flat plate portion and in a backward direction opposite to the forward direction. In this safety device, it is possible to squeeze the resin member into the gap between the rollers by moving the pushing plate in the forward direction by the pushing-plate driving unit after the resin member is fed onto the flat plate portion, so that the operator can put the resin member at a location remote from the rollers. Therefore, the safety of operation can be ensured, and the film removing can be surely carried out by squeezing the resin member into the gap between the rollers by the pushing plate, so that it is possible to enhance the capacity for processing. The safety device may further comprise a plurality of operation switches, spaced from the rollers, for turning the pushing-plate driving unit on and for allowing the rollers to rotate. In this case, the pushing-plate driving unit may move the pushing plate in the forward direction and the rollers may be driven rotationally only when all the operational switches are turned on. Alternatively, the rollers may remain being driven rotationally and the pushing-plate driving unit may move the pushing plate in the forward direction to a predetermined position only when all the operational switches are turned on. In addition, the rollers may stop to rotate and the pushing-plate driving unit may move the pushing plate in the backward direction when at least one of the operational switches are turned off while the rollers are driven rotationally. In these cases, since the rolls are driven rotationally only when all the operational switches spaced from the rollers are turned on, the operator carries out the film removing operation necessarily at a location remote from the rollers, so that it is possible to further ensure the safety of the operation.

The safety device may further comprise an emergency shutdown switch so that the rollers stop to rotate and the pushing-plate driving unit moves the pushing plate in the backward direction when the emergency shutdown switch is turned on while the rollers are driven rotationally.

In addition, the safety device may further comprise a detection device for detecting an access of a foreign matter to the rollers so that the rollers stop rotating and the pushing-plate driving unit moves the pushing plate in the backward direction when the detection device is turned on while the rollers are driven rotationally. In this case, when the detection device for detecting the access of a foreign matter to the rolls is actuated, the rolls stop to rotate and the pushing plate moves in the backward direction. Therefore, when the operator is operating the film peeling apparatus in the film peel operation, it is possible to prevent another operator from being caught his/her hand or the like in between the rolls by mistake, so that it is possible to further improve the safety. The safety device may further include a slope arranged above a rear edge of the flat plate portion so as to be inclined downwards as approaching the rolls. In this case, it is possible to liberate the operator from unnatural operational attitude, such as the case that the operator bend himself/herself when casing the resin member. Therefore, it is possible to reduce the operator's physical load to improve the operability. In addition, the operator can easily confirm the state of the resin member introduced onto the flat plate portion, by visual observation from the rear of the casting portion.

BRIEF DESCRIPTION OF THE DRAWINGS

The present invention will be understood more fully from the detailed description given hereinbelow and from the accompanying drawings of the preferred embodiment of the invention. However, the drawings are not intended to imply limitation of the invention to this specific embodiment, but are for explanation and understanding only.

In the drawings:

FIGS. 6(A) and 6(B) are explanatory drawings illustrating the operation of the safety device for the film removing apparatus, wherein FIG. 6(A) illustrates the state that an air cylinder shrinks so that a pushing plate is positioned at a backward end position, and wherein FIG. 6(B) illustrates the state that the air cylinder extends so that the pushing plate is positioned at a forward end position;

FIGS. 8(A) and 8(B) are air circuit diagrams for the air cylinder, wherein FIG. 8(A) illustrates the state in which a directional control valve for the air cylinder is OFF and FIG. 8(B) illustrates the state in which the directional control valve is ON;

DESCRIPTION OF THE PREFERRED EMBODIMENT

Referring now to the drawings, particularly to FIGS. 1 through 9, the preferred embodiment of a safety device for a film removing apparatus for removing a film from a painted or coated resin product, according to the present invention, will be described below. As a shown embodiment, the collection and recycle of a coated resin bumper, which is a relatively large component among automotive parts, will be described.

Figure 1:
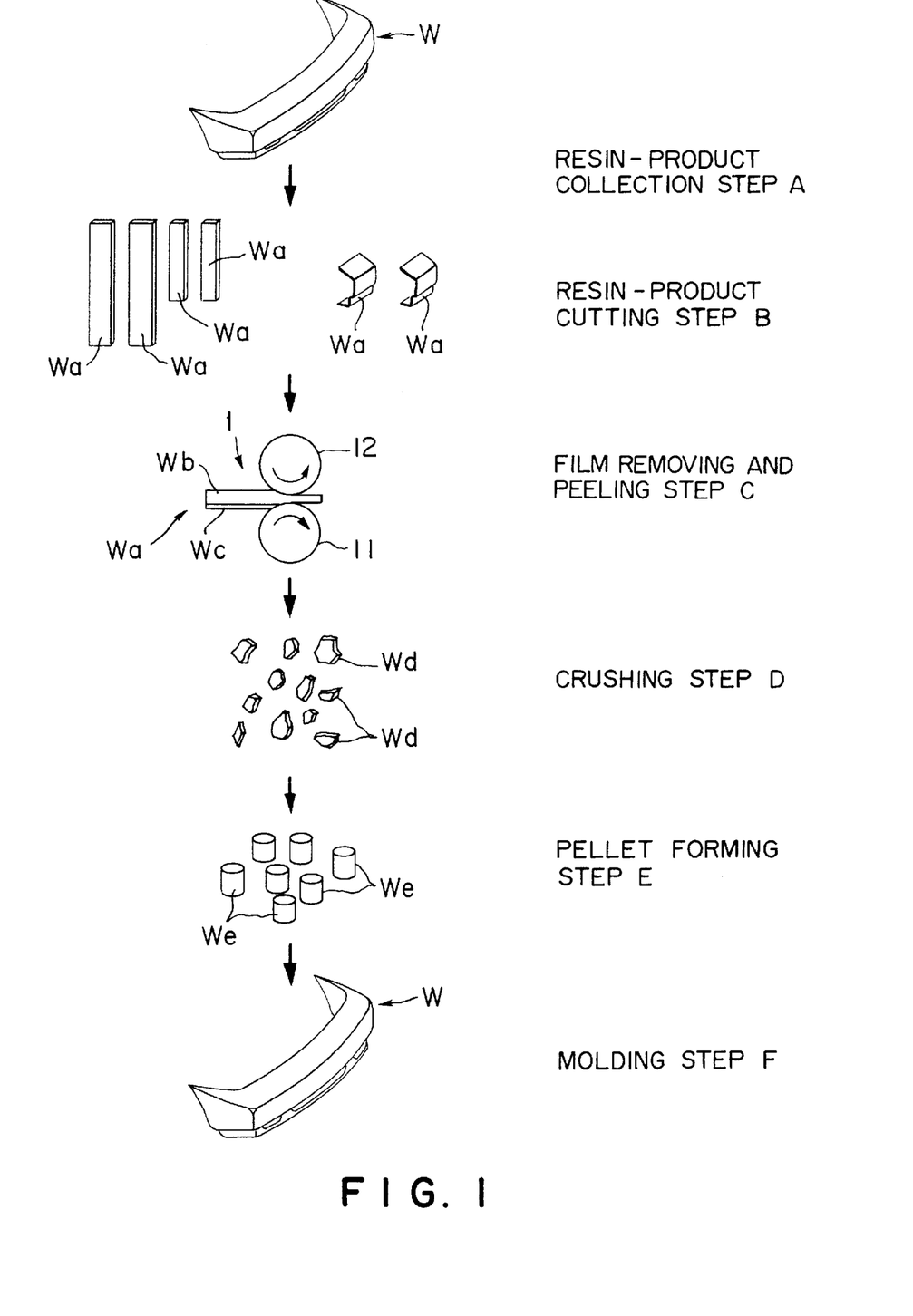
FIG. 1 is an explanatory drawing for schematically explaining a method for recycling a coated resin product by using the first preferred embodiment of a safety device for a film removing apparatus according to the present invention.

FIG. 1 is an explanatory drawing for schematically explaining a method for recycling a coated resin product, to which the preferred embodiment of the safety device for the film removing apparatus according to the present invention, is applied.

Referring to FIG. 1, this recycling method will be described. In a resin-product collection step A, a bumper W which is defective product occurred in the manufacturing and assembling process of a resin bumper or which is removed from a scrapped car, is collected, and the metal portion thereof is removed from the bumper W. If necessary, in the next resin-product cutting step B, the bumper W is cut to be divided into resin members W$a$ with a predetermined width.

Then, in a film peeling step C, a film W$c$ of the resin member W$a$ is peeled and removed from the resin material W$b$ by means of a film removing apparatus 1 which will be described later.

The resin material W$b$ obtained by removing the film W$c$ in the film peeling step C, is crushed by a shredder or the like to be crushed members W$d$ in the next crushing step D.

Then, in a pellet forming step E, the crushed members W$d$ are supplied to, for example, an extruder. In the extruder, the crushed members W$d$ fed to a hopper are moved forward in a heating cylinder rotated by a screw, and heated therein by a heater or the like. While the crushed members W$d$ are moved forward in the heating cylinder, these members are melted and extruded from a die to produce pellets W$e$ having a predetermined shape. At this time, the residual film pieces and so forth are removed by a screen mesh provided at the end portion of the heating cylinder. Furthermore, it is possible to enhance the capacity and productivity if this screen mesh can be automatically replaced.

Then, in a molding step F, a resin product such as a bumper W is molded again, after the pellets of a virgin polypropylene resin are added to the pellets W$e$ obtained in the pellet forming step E, if necessary.

While the crushed members W$d$ have been processed so as to form pellets in the pellet forming step E, it is possible to omit the pellet forming step E if the crushed members W$d$ are finely crushed members.

Referring to FIGS. 2 through 9, a film removing apparatus 1 for peeling and removing the film W$c$ from the resin material W$b$ in the film peeling step C, will be described below.

Figure 2:
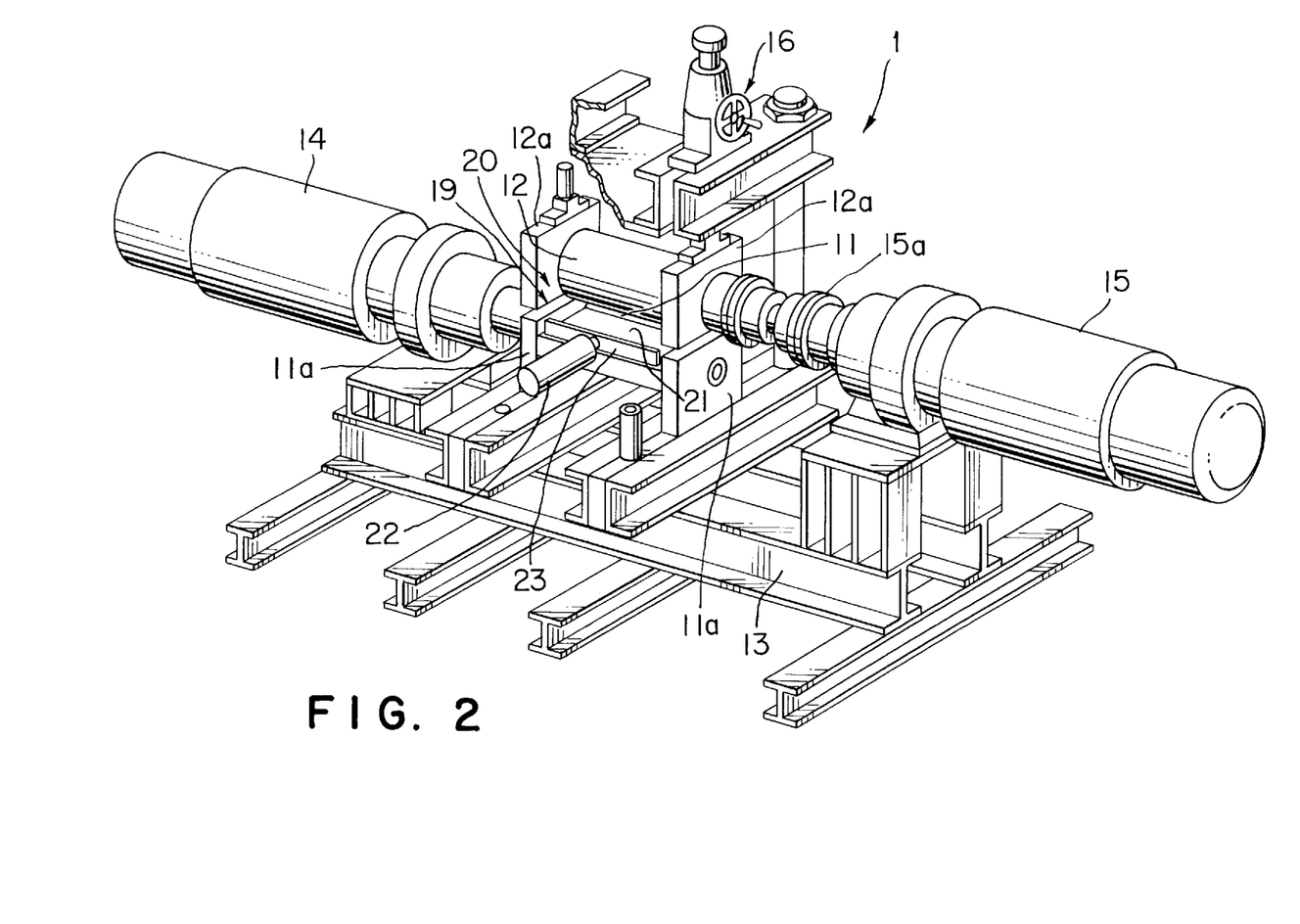
FIG. 2 is a perspective view illustrating the main portion of the film removing apparatus.
Figure 3:
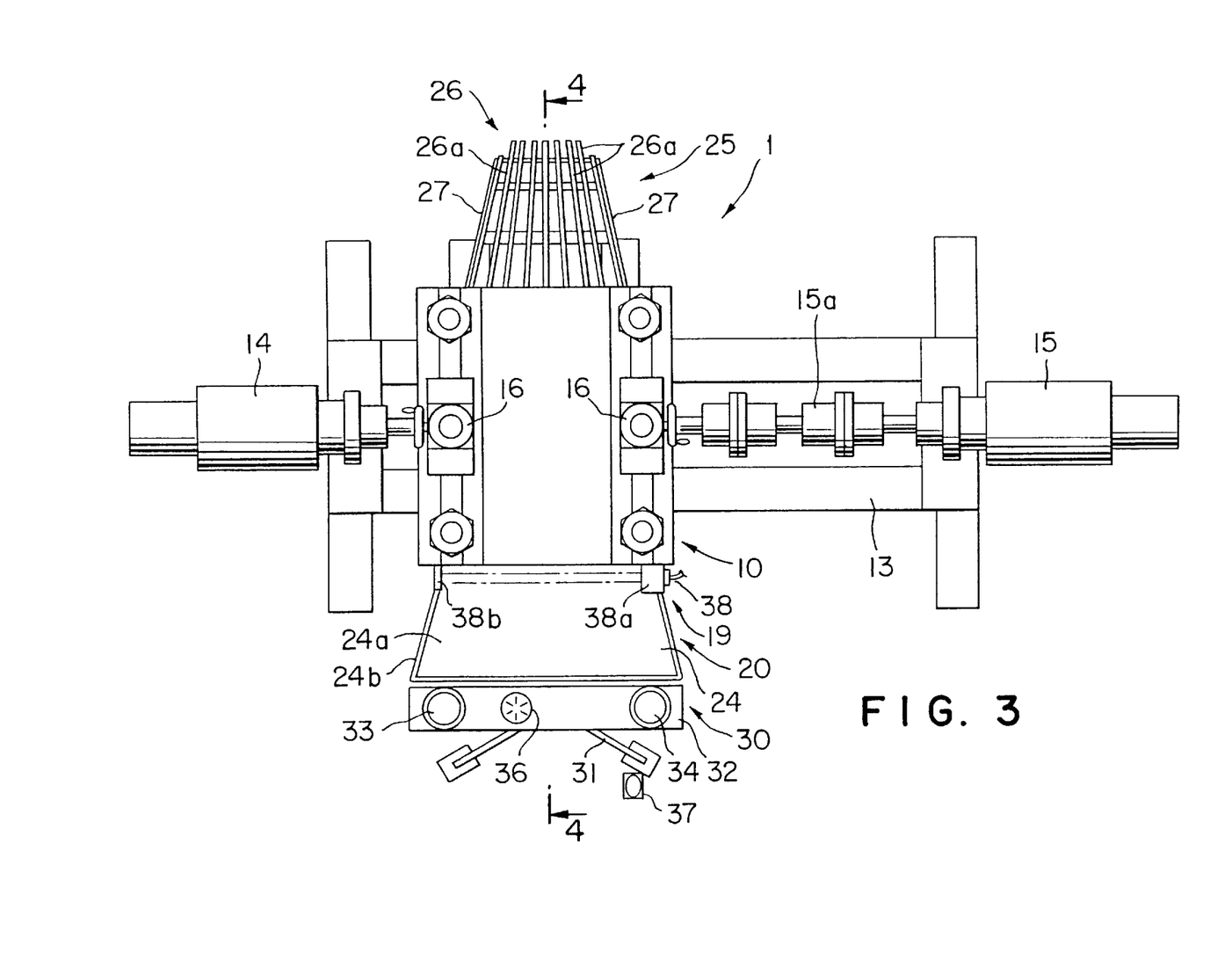
FIG. 3 is a plan view of the film removing apparatus.
Figure 4:
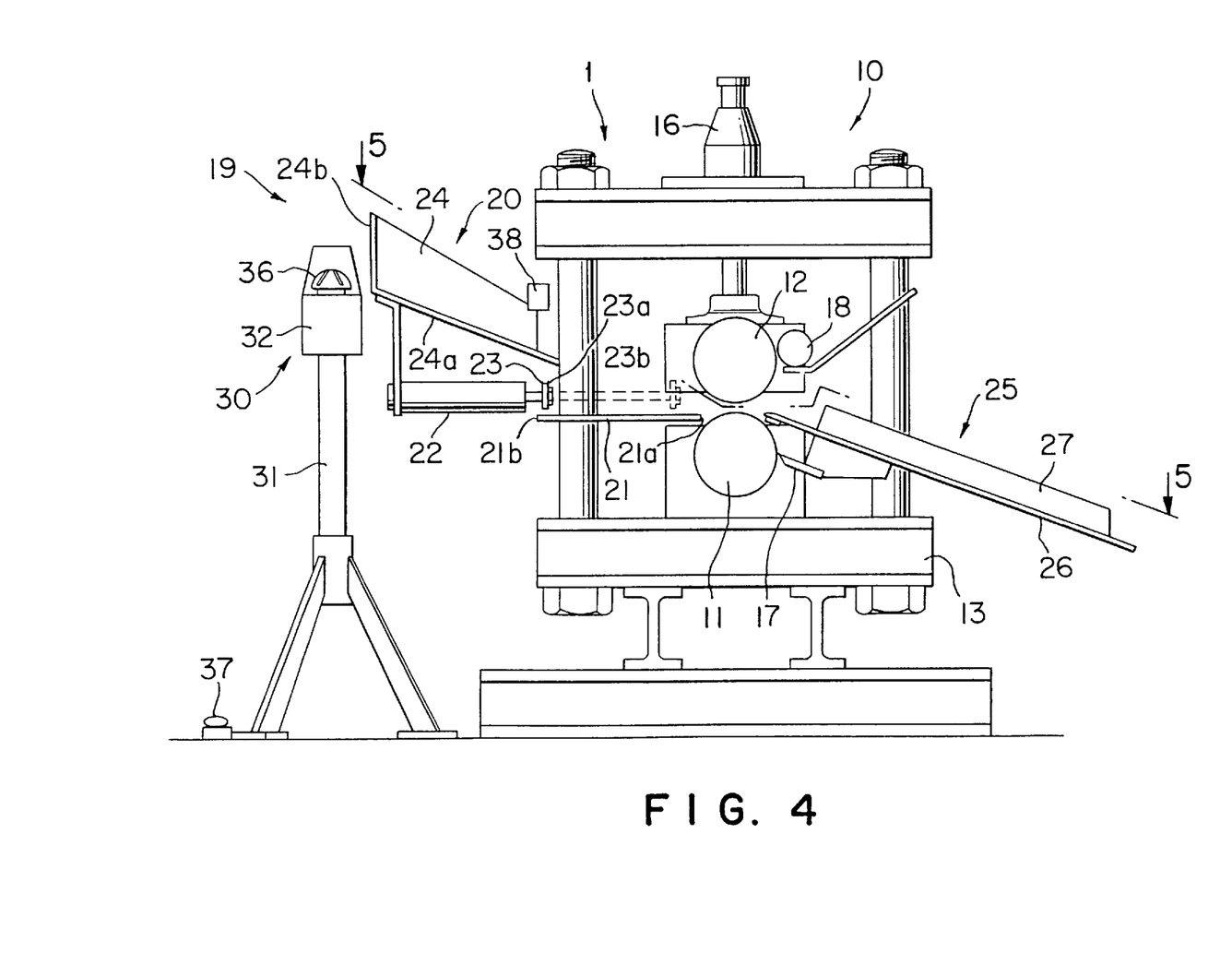
FIG. 4 is a sectional view taken along line A—A in FIG. 3.
Figure 5:
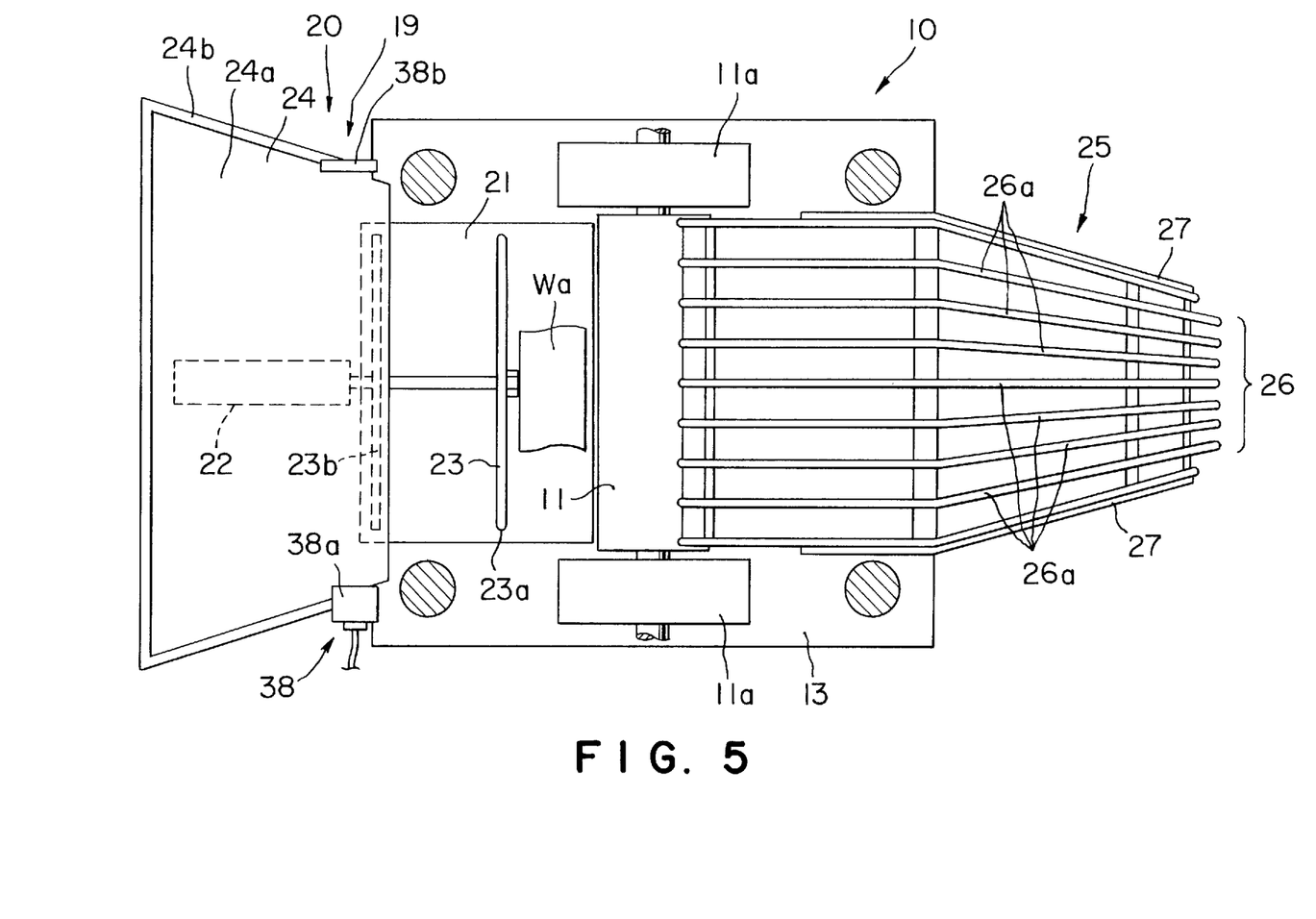
FIG. 5 is a sectional view taken along line B—B in FIG. 4.

The film removing apparatus 1 comprises a removing device 10 and an operating unit 30. FIG. 2 is a perspective view showing a main part of the removing device 10, and FIG. 3 is a plan view of the film removing apparatus 1. FIG. 4 is a sectional view taken along line A—A in FIG. 3, and FIG. 5 is a sectional view taken along line B—B in FIG. 4.

The removing device 10 has a film-side roller 11 and a resin-material-side roll 12 facing each other. Each of the film-side roller 11 and the resin-material-side roll 12 is made of a metal. The mirror polishing or chrome plating is carried out on the surfaces of these rolls. The film-side roll 11 is rotatably supported between a pair of film-side roll supporting members 11a provided on a support frame 13, and is driven rotationally by a drive unit 14 such as a motor with a reduction gear.

On the other hand, the resin-material-side roll 12 is rotatably supported between the resin-material-side roll supporting members 12a, which are supported on the support frame 13 so as to be movable upwardly and downwardly, and is driven rotationally by a rotational drive unit 15 such as a motor with the reduction gear connected through a universal joint 15a. When the resin-material-side roll supporting members 12a are moved up and down by a lifter 16, the resin-material-side roll 12 moves up and down to adjust the quantity of clearance between the film-side roll 11 and the resin-material-side roll 12. By this adjustment, the thickness of the resin member Wa, from which the film is removed, and the pressing force applied to the resin member Wa for rolling are adjustably set.

The peripheral rotating speed of the film-side roll 11 is different from that of the resin-material-side roll 12. That is, the peripheral rotating speed of the film-side roll 11 tightly contacting the surface of the film Wc is larger than the peripheral rotating speed of the resin-material-side roll 12 tightly contacting the surface of the resin material Wb, and these rolls are driven rotationally in the reverse directions so as to nip the resin member Wa, which is supplied to the gap between both rolls 11 and 12, while applying the pressing force thereto.

Adjacent to the roll surface of film-side roll 11, a scraper 17 for scraping the film adhered to the roll surface of the film-side roll 11 is provided. The film Wc scraped and removed from the roll surface of the film-side roll 11 by the scraper 17 is carried to the outside of the film removing apparatus 1 by a belt conveyor (not shown) and so forth and is collected. Furthermore, the reference number 18 denotes a cleaning member, for example, made of a cloth, for slidably contacting the roll surface of the resin-material-side roll 12 to scrape dusts, film pieces and so forth which are adhered to the roll surface.

Moreover, the removing device 10 is provided with a work-piece feeder 20 forming a safety device 19 with the operating unit 30 which will be described later, and a carrying device 25 for carrying the resin material Wb to the outside after the film Wc is removed from the resin material Wb.

The work-piece feeder 20 comprises: a flat plate plane portion 21, which has a front edge 21a located in the neighborhood of the film-side roll 11 and which extends in a substantially horizontal direction between the facing support members 11a of the film-side roll 11 at a level substantially corresponding to the gap between the film-side roll 11 and the resin-material-side roll 12; and a pushing plate 23 which reciprocates along the upper surface of the flat plate portion 21 between a forward end position 23a close to the film-side roll 11 and a backward end position 23b remove from the film-side roll 11, by the telescopic motion of a pushing plate driving unit, e.g. an air cylinder 22, arranged at the rear edge 21b of the flat plate portion 21.

Figure 6A:
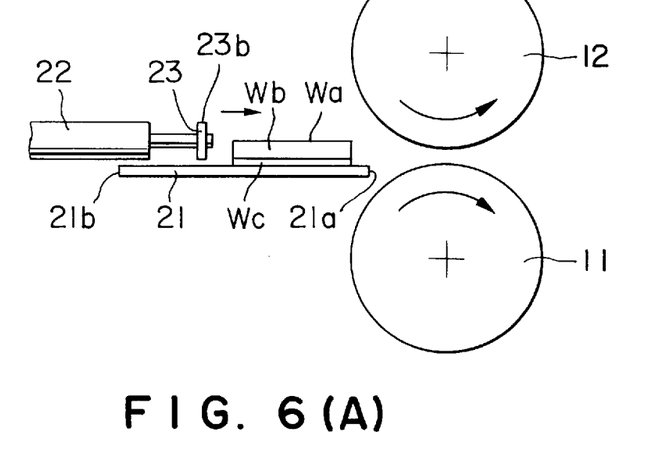

A casting portion 24 is provided above the air cylinder 22 arranged at the rear edge 21b of the flat plate portion 21. The casting portion 24 comprises a slope 24a inclined downwards as approaching the film-side roll 11, and a substantially U-shaped flange portion 24b projecting from both side edges and the rear edge of the slope 24a. The resin member Wa cast onto the slope 24a of the casting portion 24 slides down the slope 24a to drop to the flat plate portion 21. Then, the resin member Wa is squeezed and supplied to the gap between the film-side roll 11 and the resin-material-side roll 12 by the pushing plate 23 which moves forwardly from the backward end position 23b as shown in FIG. 6(A) to the forward end position 23a shown in FIG. 6(B) by the extension of the air cylinder 22.

Figure 6B:
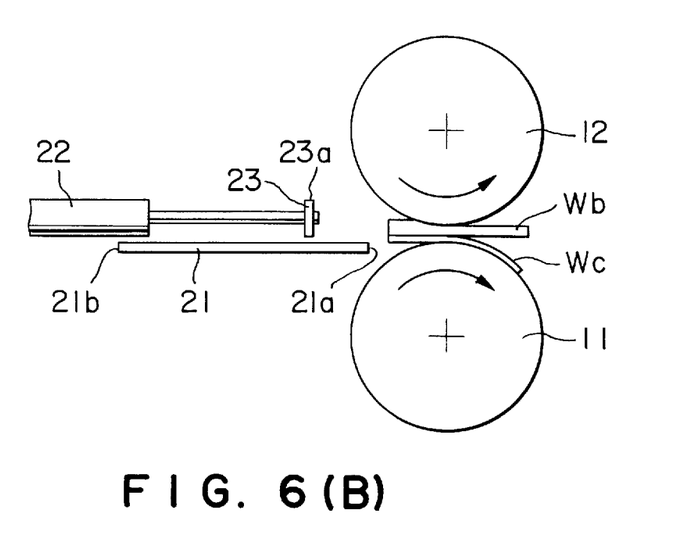

Therefore, since the casting portion 24 has the inclined slope 24a, it is not required to bend or incline the operator's body when casting the resin member Wa. As a result, it is possible to liberate the operator from unnatural operation attitude to reduce the operator's physical load in the casting operation of the resin member Wa, so that it is possible to improve the operability. In addition, the operator can easily confirm the resin member Wa introduced onto the flat plate portion 21, by visual observation from the rear of the casting portion 24.

The carrying device 25 is arranged on the opposite side to the work-piece feeder 20 via the film-side roll 11 and the resin-material-side roll 12. The carrying device 25 comprises a bottom portion 26 and a guide member 27 projecting from both ends of the bottom portion 26. A plurality of guide bars 26a are provided on the bottom portion 26 at regular intervals. The upper ends of the guide bars 26a are arranged at locations neighboring the upper part of the roll surface of film-side roll 11. The guide bars 26a are inclined downwardly as increasing the distance from the film-side roll 11, and the lower ends thereof reach to the outside of the removing device 10. The resin material Wb is designed to slide on the bottom portion 26 to be carried to the outside.

On the other hand, the operating unit 30 arranged in the vicinity of the casting portion 24 of the removing device 10 has a support frame 31, and an operation box 32 supported on the support frame 31. On the upper surface of the operation box 32, a first emergency shutdown switch 36 is arranged between first and second operation switches 33 and 34 spaced at a predetermined interval. A second emergency shutdown switch 37 is provided beneath the support frame 31. The second emergency shutdown switch 37 is actuated by operating a pedal by the operator for example.

A detection device 38 for detecting the entering of a foreign matter, i.e. the access of a foreign matter to the rolls 11 and 12, is provided under the casting portion 24. For example, the detection device 38 includes a photoelectric tube 38a and a reflector plate 38b, which face each other at both ends of the casting portion 24 above the slope 24a so as to be spaced from the slope 24a by a larger distance than at least the thickness of the resin member Wa. Ray of light emitted from the photoelectric tube 38a is reflected on the reflector plate 38b, and the reflected light is received by photoelectric tube 38a again. When both of the first and second operation switches 33 and 34 are turned ON, the detection device 38 is switched to an ON condition in which it is able to detect the entering of a foreign matter. When at least one of the first and second operation switches 33 and 34 is turned OFF, the detection device 38 is switched to an OFF condition in which the detection is stopped.

When a foreign matter enters between the photoelectric tube 38a and the reflector plate 38b on the ON condition to intercept the ray of light to interrupt the receiving of light by the photoelectric tube 38a, the detection device 38 is switched to the OFF condition.

Moreover, a control unit (not shown) is provided in the operation box 32 of the operating unit 30 or in the removing device 10, for controlling the rotation drive units 14, 15 and the air cylinder 22 which are provided in the removing device 10, in accordance with the operations of the first and second operation switches 33, 34, and the first and second emergency shutdown switches 36, 37, and the actuation of the detection device 38.

Figure 7:
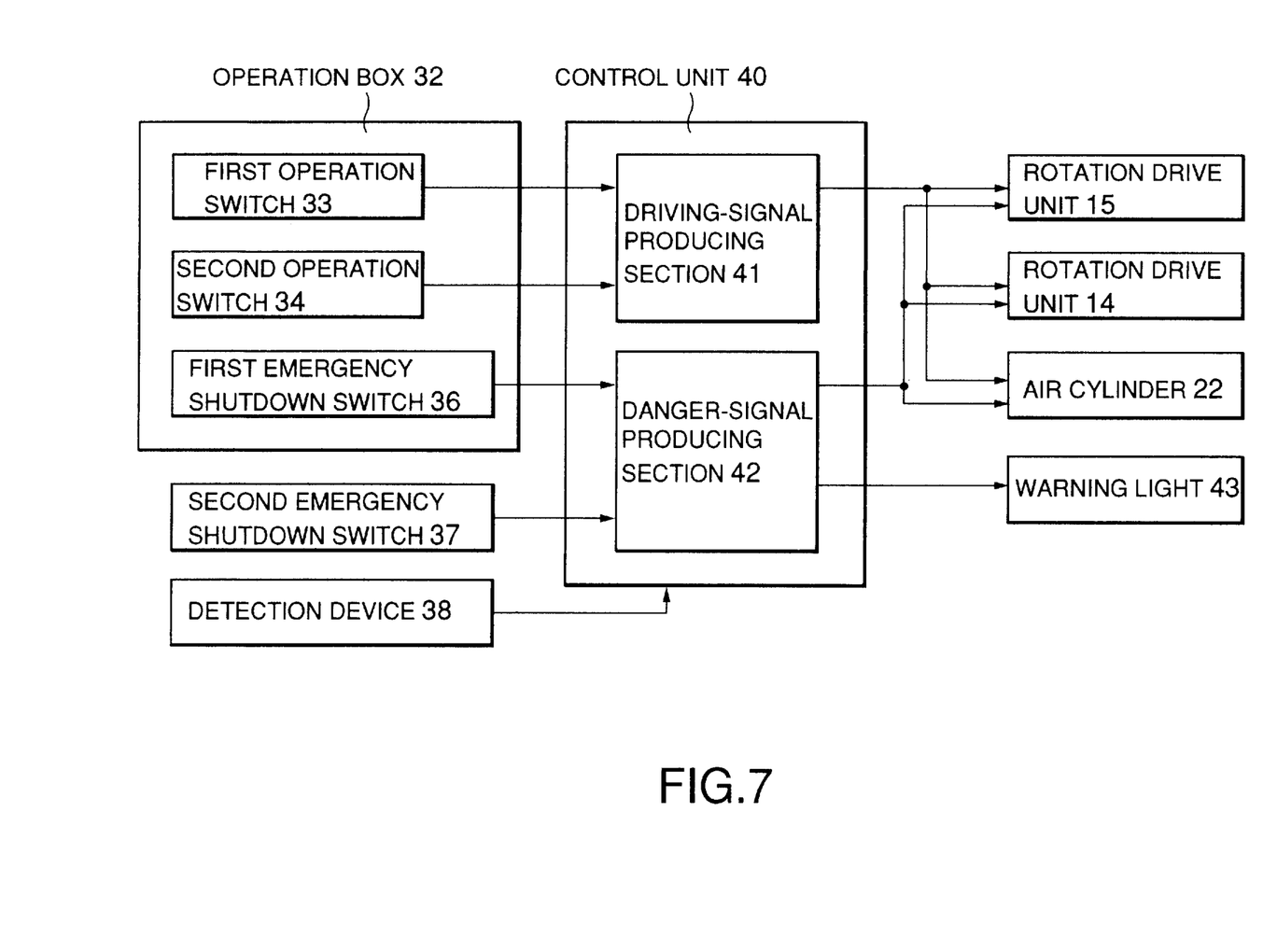
FIG. 7 is block diagram illustrating the operation of the film removing apparatus.

Referring to the block diagram of FIG. 7, the operation of each of the switches 33, 34, 36, 37, the detection device 38 and the rotation drive units 14, 15, will be described below.

In the drawing, the reference number 40 denotes a control unit. The control unit 40 has a driving-signal producing section 41 and a danger-signal producing section 42. When the first and second operation switches 33 and 34 provided in the operation box 32 are operated by the pushing operation by the operator, i.e. when these switches are turned ON, the driving-signal producing section 41 produces an operation signal. On the basis of the operation signal from the driving-signal producing section 41, the rotation drive units 14 and 15 operate during the pushing operation, and the air cylinder 22 extends to move the pushing plate 23 forwards from the backward end position 23b to the forward end position 23a.

When the operator stops to push at least one of the first and second operation switches 33 and 34, i.e. when at least one of the first and second operation switches 33, 34 is turned OFF, a danger signal is outputted from the danger-signal producing section 42. On the basis of the danger signal from the danger-signal producing section 42, the rotation drive units 14 and 15 stop rotating, and the air cylinder 22 retracts to return the pushing plate 23 to the backward end position 23b.

In addition, while the first and second operation switch 33 and 34 are actuated, when the second emergency shutdown switch 37 is turned ON by the pushing operation or pedal operation of the first emergency shutdown switch 36, the danger signal is produced from the danger-signal producing section 42. On the basis of the danger signal from the danger-signal producing section 42, the rotation drive units 14 and 15 stop rotating, and the air cylinder 22 retracts to return the pushing plate 23 to the backward end position 23b. In addition, a warning light 43 and so forth are turned ON for warning.

Moreover, while the first and second operation switches 33 and 34 are actuated, when the light received by the photoelectric tube 38a is intercepted by a foreign matter entering between the photoelectric tube 38a and the reflector plate 38b of the detection device 38 to switch the detection device to the OFF condition, a danger signal is produced from the danger-signal producing section 42. On the basis of the danger signal from the danger-signal producing section 42, the rotation drive units 14 and 15 stop rotating, and the air cylinder 22 retracts to return the pushing plate 23 to the backward end position 23b.

Furthermore, even in a case where the danger signal from the danger-signal producing section 42 is designed to have priority over the operation signal from the driving-signal producing section 41 and both of the first and second operation switches 33 and 34 are ON, if the first or second emergency shutdown switch 36, 37 is operated, it is possible to surely perform the emergency shutdown of the rotation drive units 14 and 15 and so forth and to surely return the pushing plate 23 to the backward end position 23b by retracting the air cylinder 22.

Then, referring to the cylinder air circuit 44 shown in FIG. 8, the operation of the air cylinder 22 will be described in detail.

In the drawing, the reference number 45 denotes an air source, and the reference number 46 denotes a main air feed circuit. The main air feed circuit 46 has a ball cock 47, a regulator 48 and a directional control valve 49 for the air cylinder, which are arranged in line. When the ball cock 47 is open, air from the air source 45 is supplied to the regulator 48 by which the air pressure is adjusted to be supplied to the directional control valve 49.

The directional control valve 49 is connected to a first piston chamber 22a of the air cylinder 22 via an air feed circuit 50 for a forward movement wherein a speed controller 51 comprising a flow regulating valve 51a and a check valve 51b is provided. The directional control valve 49 is also connected to a second piston chamber 22b of the air cylinder 22 via an air feed circuit 54 for a backward movement wherein a speed controller 53 comprising a flow regulating valve 53a and a check valve 53b is provided.

Figures 8A, 8B:
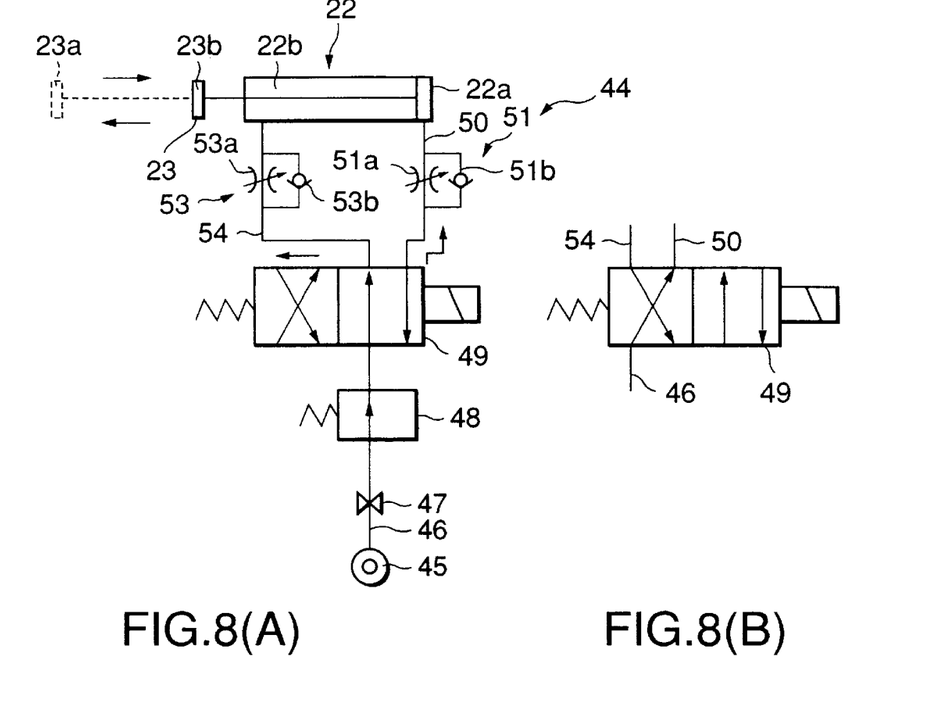

When both the first and second operation switches 33 and 34 are turned ON, the directional control valve 49 is changed from an OFF condition shown in FIG. 8(A) to an ON condition shown in FIG. 8(B) in response to the operation signal inputted from the driving-signal producing section 41 of the control unit 40. And, at the same time, air is supplied from the main air feed circuit 46 to the first piston chamber 22a through the air feed circuit 50 and the speed controller 51 while the supply flow rate thereof is adjusted.

Then, when the air is supplied to the first piston chamber 22a, the air in the second piston chamber 22b is discharged from the directional control valve 49 via the air feed circuit 54 for backward movement and the speed controller 53 to extend the air cylinder 22. When the air cylinder 22 extends, the pushing plate 23 moves forwards from the backward end position 23b to the forward end position 23a at which the pushing plate stops.

Then, when at least one of the first and second operation switches 33 and 34 is turned OFF, the directional control valve 49 is switched to the OFF condition. As a result, the air is supplied to the second piston chamber 22b via the air feed circuit 54 for backward movement and the speed controller 53. When air is supplied to the second piston chamber 22b, the air in the first piston chamber 22a is discharged from the directional control valve 49 via the air feed circuit 50 and the speed controller 51, so that the air cylinder 22 retracts to move the pushing plate 23 backwards to the backward end position 23b at which the pushing plate 23 stops.

In addition, even if both the first and second operation switches 33 and 34 are turned ON and the pushing plate 23 is moving from the backward end position 23b to the forward end position 23a by extending the air cylinder 22, when at least one of the first and second operation switches 33 and 34 is turned OFF, or when the directional control valve 49 is switched to the OFF condition by the danger signal from the danger-signal producing section 42 by operating the first or second emergency shutdown switch 36, 37, the air cylinder 22 retracts to return the pushing plate 23 to the backward end position 23b.

Figure 9:
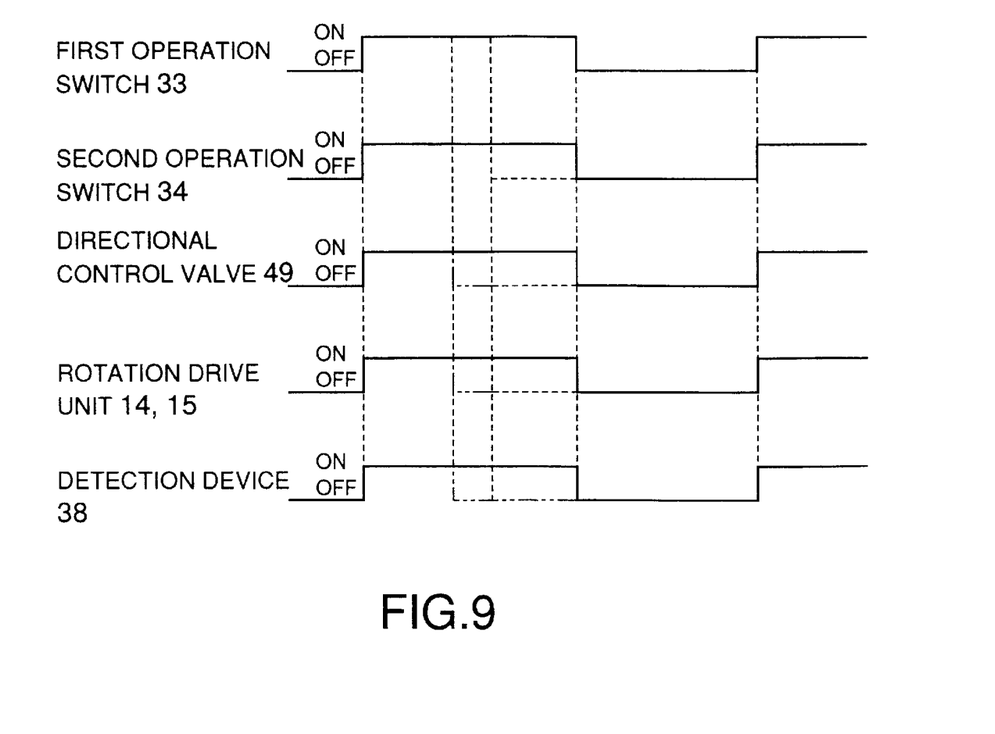
FIG. 9 is a timing chart for a control circuit.

Referring to the timing chart for the control shown in FIG. 9, the operation of the film removing apparatus 1 with this structure will be described below.

First, the operator throws the resin member Wa onto the slope 24a of the throw-in portion 24 of the removing device 10, wherein the quantity of the gap between the film-side roll 11 and the resin-material-side roll 12 is previously adjusted by the lifter 16, in such a way that the film Wc faces the slope 24a.

The resin material thrown in Wa slides down the slope 24a to fall on the flat plate portion 21 as shown in FIG. 6(A). At this time, the pushing plate 23 is positioned at the backward end position 23b near the rear edge 21b of the flat plate portion 21, so that the operator can confirm the state of the resin member Wa introduced onto the flat plate portion 21 by visual observation from the rear-side of the inclined slope 24a.

After the resin member Wa is introduced onto the flat plate portion 21, the operator pushes the first and second operation switches 33 and 34 which are provided on the operation box 32 of the operating unit 30 so as to be spaced from each other. Since the first and second operation switches 33 and 34 are spaced from each other via the emergency shutdown switch 36, the operator must push the first and second operation switches 33 and 34 with both hands necessarily. Therefore, the operator can carry out the pushing operation of the first and second operation switches 33 and 34 at a location sufficiently remote from the film-side roll 11 and the resin-material-side roll 12.

When both the first and second operation switches 33 and 34 are turned ON by the pushing operation, the rotation drive units 14 and 15 are actuated on the basis of the operation signal from the driving-signal producing section 41. And then, the film-side roll 11 and the resin-material-side roll 12 start to rotate in the reverse directions so that the peripheral rotating speed of the film-side roll 11 is larger than that of the resin-material-side roll 12. In addition, the directional control valve 49 of the cylinder air circuit 44 is changed from the OFF condition shown in FIG. 8(A) to the ON condition shown in FIG. 8(B). Moreover, the air is supplied to the first piston chamber 22a of the air cylinder 22, so that the air cylinder 22 starts to extend and the detection device 38 is changed to the ON condition wherein it can detect the entering of the foreign matter.

When the air cylinder 22 extends, the pushing plate 23 moves forwards from the backward end position 23b to push the resin member Wa introduced onto the flat plate portion 21, to supply the resin member Wa to the gap between the film-side roll 11 and the resin-material-side roll 12.

The resin member Wa is pushed by the pushing plate 23 to move forwards while being securely squeezed into the gap between the film-side roll 11 and the resin-material-side roll 12. Then the resin member Wa is rolled by pressing force between the film-side roll 11 and the resin-material-side roll 12, and the shearing stress is applied between the resin material Wb and the film Wc on the basis of the difference between the peripheral rotating speeds of the rolls 11 and 12, so that the film Wc is removed from the resin material Wb.

After the processing is completed, when the operator keeps his/her hand away from at least one of the first and second operation switches 33 and 34, the directional control valve 49 is switched to the OFF condition shown in FIG. 8(A). As a result, the air fed into the first piston chamber 22a stops so that the pushing plate 23 stops at the forward end position 23a. In addition, the air is supplied to the second piston chamber 22b so that the air cylinder 22 retracts to move the pushing plate 23 backwards to the backward end position 23b at which the pushing plate 23 stops.

On the other hand, the resin material Wb, from which the film Wc has been peeled, is fed onto the inclined bottom portion 26 of the carrying device 25 by the rolls 11 and 12, and slides on the bottom portion 26 to be discharged from the film removing apparatus 1 to be collected. In addition, the film Wc removed from the resin material Wb is conveyed while being adhered to the roll face of the film-side roll 11. Then, the film Wc is scraped from the roll face of the film-side roll 11 by the scraper 17, and carried on a belt conveyer or the like to be discharged from the film removing apparatus 1 to be collected.

After removing the film Wc from the resin material Wb by the cooperation of the film-side roll 11 with the resin-material-side roll 12, the operator stops pushing the first and second operation switches 33 and 34, i.e., the operator keeps his/her hand away from the first and second operation switches 33 and 34. The rotation drive units 14 and 15 are turned OFF, so that the film-side roll 11 and the resin-material-side roll 12 stop rotating.

By repeating this operation, the film Wc is successively peeled and removed from the resin material Wb of resin member Wa.

In addition, during the film removing operation wherein the first and second operation switches 33 and 34 are pushed, as the operator keeps his/her hand away from at least one of the first and second operation switches 33 and 34, i.e., as at least one of the first and second operation switches 33 and 34 is turned OFF, a danger signal is produced from the danger-signal producing section 42. Similarly, at this time, the second operation switch 34 is turned OFF as shown by the broken line in FIG. 9. In response to the danger signal from the danger-signal producing section 42, the actuation of the rotation drive units 14 and 15 stops as shown by the broken line in FIG. 9, and consequently stops the film-side roll 11 and the resin-material-side roll 12 from rotating. In addition, the directional control valve 49 is switched to the OFF condition as shown by the broken lines in FIGS. 8(A) and 9. And then the valve 49 stops the air feed into the first piston chamber 22a and feeds the air into the second piston chamber 22b, so that the air cylinder 22 retracts to move the pushing plate 23 backwards to the backward end position 23b at which the pushing plate 23 stops.

Therefore, only when the operator pushes both the first and second operation switches 33 and 34, the film-side roll 11 and the resin-material-side roll 12 are driven rotationally. Necessarily, the operator is sufficiently remote from the rolls 11 and 12 while pushing the switches 33 and 34, so that it is possible to prevent the operator's hand or the like from being caught in between both rolls 11 and 12, and it is possible to ensure safety operation.

In addition, even if the first or second emergency shutdown switches 36, 37 are operated for some reason or other during the film removing operation, the actuation of the rotation drive units 14, 15 stops by the danger signal from the danger-signal producing section 42, and stops the film-side roll 11 and the resin-material-side roll 12 from rotating. In addition, the directional control valve 49 is switched to the OFF condition, so that the air cylinder 22 retracts to move the pushing plate 23 backwards to the backward end position 23b at which the pushing plate 23 stops.

Moreover, when the detection device 38 detects the entering of the foreign matter to become the OFF condition in the film removing operation in which the first and second operation switches 33 and 34 are pushed, the danger signal is produced from the danger-signal producing section 42. In response to the danger signal, the actuation of the rotation drive units 14 and 15 stops as shown by the two-dot chain line in FIG. 9. In addition, the directional control valve 49 is switched to the OFF condition as shown by the two-dotted chain line in FIGS. 8(A) and 9 to stop the air supply into the first piston chamber 22a and to supply the air to the second piston chamber 22b, so that the air cylinder 22 retracts to move the pushing plate 23 backwards to the backward end position 23b at which the pushing plate 23 stops.

Therefore, in the film peeling operation wherein the operator is pushing the first and second operation switches 33 and 34, if another operator brings his/her hand or the like close to the rolls 11 and 12 by mistake, it is detected by the detection device 38, so that the film-side roll 11 and the resin-material-side roll 12 stop to rotate, and the pushing plate 23 is moved backwards. Therefore, it is possible to prevent the operator's hand or the like from being caught in between the rolls 11 and 12, so that it is possible to further improve the safety of the operation.

As mentioned above, according to the aforementioned preferred embodiment of the present invention, the safety device for the film removing device has the pushing plate 23, which reciprocates along the upper surface of the flat plate portion 21, extends horizontally at a height corresponding to the gap between the film-side roll 11 and the resin-material-side roll 12 by the extension of the air cylinder 22, and moves forwards to squeeze the resin material Wa into the gap between the film-side roll 11 and the resin-material-side roll 12. Therefore, it is not required to directly push the resin material into the gap between the rolls 11 and 12, and it is possible to rotate the rolls 11 and 12 and to move the pushing plate 23 forwards only by pushing both of the first and second operations switches 33 and 34 which are spaced from each other on the operation box 32 remove from the rolls 11 and 12. The first and second operation switches 33 and 34 are necessarily operated by the operator's both hands, so that the operator's body is remote from the film-side roll 11 and the resin-material-side roll 12 driven rotationally. Accordingly, it is possible to prevent the operator's hand or the like from being caught in between the rolls 11 and 12, so that it is possible to very safely carry out the operator's work.

In addition, when the first or second emergency shutdown switch 36, 37 is operated, or when the detection device 38 detects the entering of a foreign matter, the film-side roll 11 and the resin-material-side roll 12 stop to rotate and the pushing plate 23 stops to move forwards, so that it is possible to improve the operation safety.

Moreover, it is possible to securely carry out the film removing processing by pushing the resin member Wa into the rolls 11 and 12 by using the pushing plate 23, so that it is possible to improve the processing capacity.

In addition, according to the present invention, the safety device has the throw-in portion 24 provided with the inclined slope 24a above the rear edge 21b of the flat plate portion 21. Therefore, when the operator throws in the resin member Wa, it is not required to incline or bent the operator's body, so that it is possible to reduce the operator's physical load to improve the operability. In addition, the operator can easily confirm the state of the resin member Wa thrown into the flat plate portion 21 by visual observation.

While the present invention has been disclosed in terms of the preferred embodiment in order to facilitate better understanding of the invention, it should be appreciated that the invention can be embodied in various ways without departing from the principle of the invention. Therefore, the invention should be understood to include all possible embodiments and modifications to the shown embodiments which can be embodied without departing from the principle of the invention as set forth in the appended claims.

What is claimed is:

1. A safety device for a film removing apparatus having, rolls to crush a coated resin member therebetween, said rolls are a pair of rolls facing each other and rotating at different peripheral rotating speeds and applying a shearing stress between a resin material and a film to separate the film from the resin material, said safety device comprising:

a flat plate provided to extend in a substantially horizontal direction at a height substantially corresponding to a gap between the rolls;

a pushing plate for pushing material on said flat plate to supply said resin material into said gap between the rolls; and pushing-plate driving means for moving said pushing-plate in a forward direction to cause said pushing plate to slide on said flat plate.

2. The safety device for the film removing apparatus, as set forth in claim 1, further comprises:

a plurality of operation switches provided on a switch panel spaced from said rolls, for turning said pushing-plate driving unit on and for allowing said rolls to rotate.

3. The safety device for the film removing apparatus, as set forth in claim 2, wherein:

said pushing-plate driving unit moves said pushing plate in said forward direction; and said rolls are driven rotationally only when all the plurality of said operation switches are turned on.

4. The safety device for the film removing apparatus, as set forth in claim 1, wherein:

said rolls remain being driven rotationally; and said pushing-plate driving unit moves said pushing plate in said forward direction to a predetermined position only when all the plurality of said operation switches are turned on.

5. The safety device for the film removing apparatus, as set forth in claim 1, wherein:

said rolls stop rotating and said pushing-plate driving unit moves said pushing plate in said backward direction when at least one of said plurality of operation switches are turned off while said rolls are driven rotationally.

6. The safety device for the film removing apparatus, as set forth in claim 1, further comprises:

an emergency shutdown switch for stopping said rolls from rotating and for moving said pushing plate in said backward direction when said emergency shutdown switch is turned on while said rolls are driven rotationally.

7. The safety device for the film removing apparatus, as set forth in claim 1, further comprises:

a detection device for detecting an access of a foreign matter to said rolls; and said rolls stop rotating and said pushing-plate driving unit moves said pushing plate in said backward direction when said detection device is turned on while said rolls are driven rotationally.

8. The safety device for the film removing apparatus, as set forth in claim 1, further comprises:

a slope arranged above a rear edge of said flat plate portion so as to be inclined downwards as approaching said rolls.

* * * * *